Sept. 27, 1960   R. U. PENROD   2,954,211
METHOD AND MEANS FOR DRILLING WITH CHANGEABLE BITS
Filed April 4, 1957   3 Sheets-Sheet 1
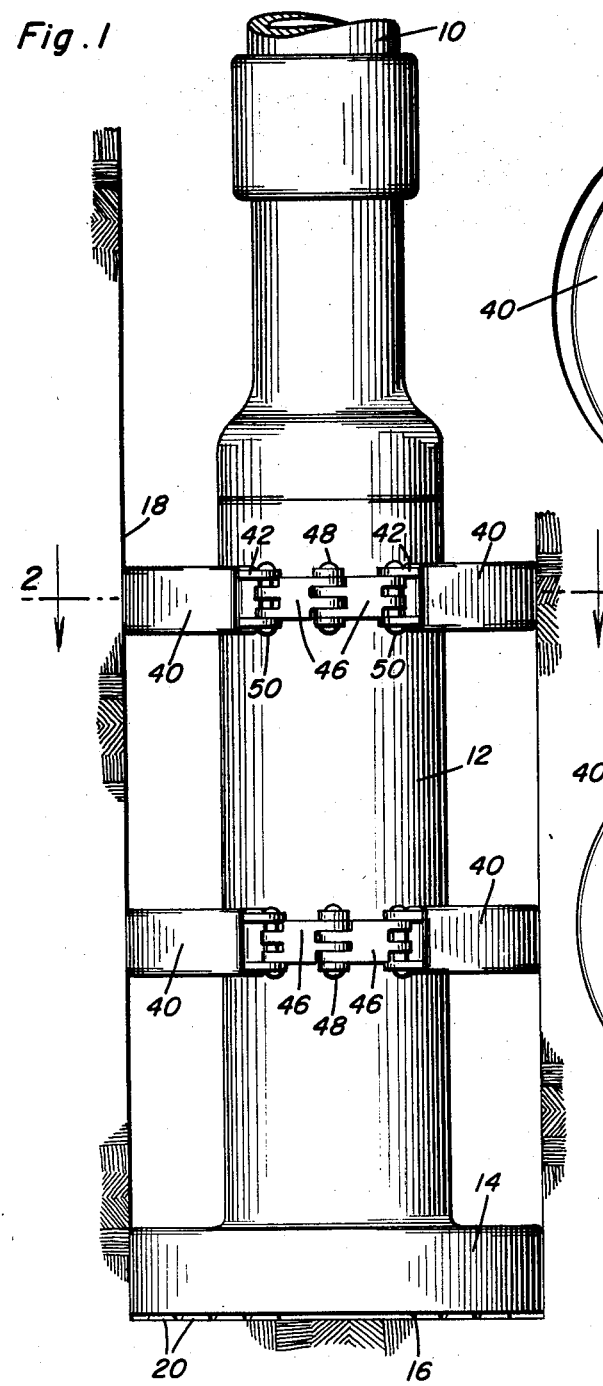
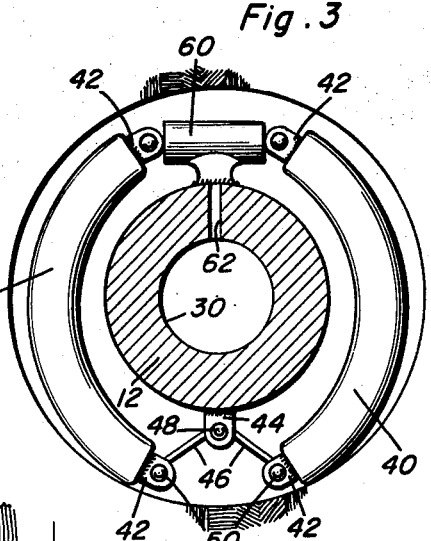
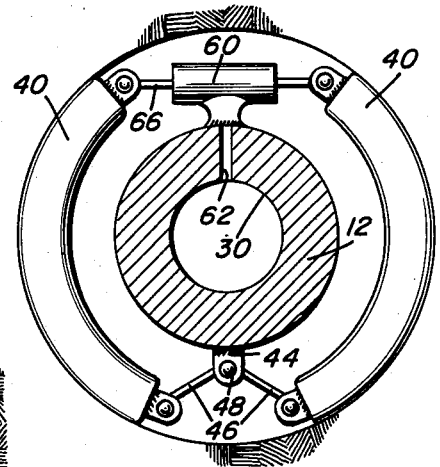
Ralph U. Penrod
INVENTOR.

Sept. 27, 1960 R. U. PENROD 2,954,211
METHOD AND MEANS FOR DRILLING WITH CHANGEABLE BITS
Filed April 4, 1957 3 Sheets-Sheet 2

Ralph U. Penrod
INVENTOR.

BY *[signatures]*
Attorneys

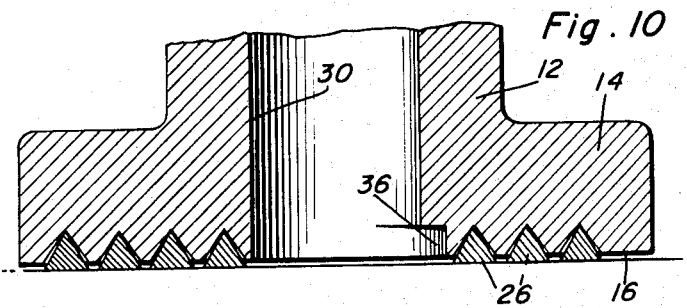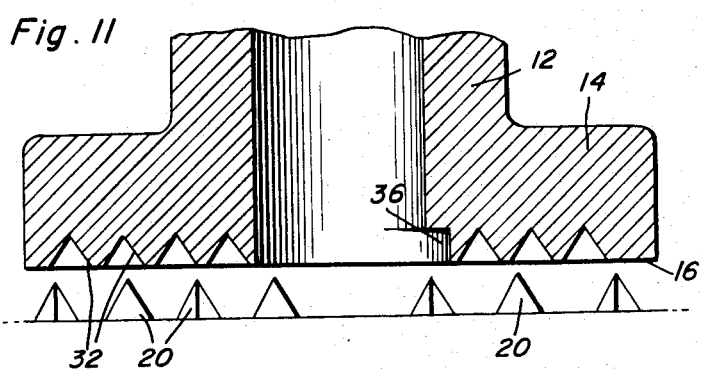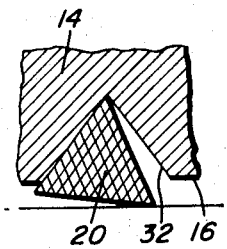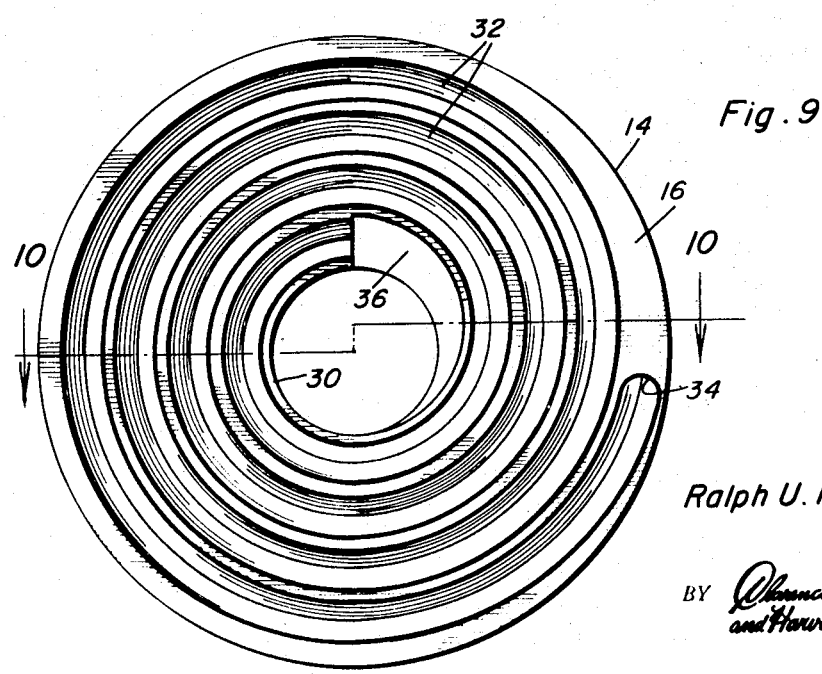

2,954,211
METHOD AND MEANS FOR DRILLING WITH CHANGEABLE BITS

Ralph U. Penrod, R.F.D. 2, Crooksville, Ohio

Filed Apr. 4, 1957, Ser. No. 650,749

6 Claims. (Cl. 255—61)

This invention comprises a novel and useful method and means for drilling with changeable bits, and more particularly relates to the art of drilling bores by the rotary method and whereby the continuous life of a drill is prolonged indefinitely through the use of a plurality of changeable bits which may be changed or replaced without the necessity for removing the drill from the bottom portion of the bore.

An important object of this invention is to provide a drill having a very large number of cutting surfaces upon its bits which may be interchangeably placed in operation, thereby extending the life of the drill.

A further object of the invention is to provide a drill in accordance with the preceding objects wherein the interchanging of the drill bits may be effected without the necessity for removing the drill from the bore being drilled thereby.

Yet another object of the invention is to provide a drill in accordance with the preceding objects wherein a relatively large number of replaceable and interchangeable drill bits may be selectively interchangeably placed in operation in order to provide fresh cutting surfaces for the drill; and wherein such interchangeability and replaceability of the drill bits may be effected without the necessity for removing the drill from a well bore by only slightly lifting the drill from the bottom surface of the bore and by means of the pressure of the drilling mud.

A still further object of the invention is to provide a drill and a method of drilling wherein a relatively large number of polyhedron drill bits may be interchangeably employed with the drill for providing a relatively large number of interchangeable cutting surfaces for the drill.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing an embodiment of a drill in accordance with this invention positioned operatively at the bottom of a bore being drilled by the device, a part of the drill stem being broken away;

Figure 2 is a horizontal sectional view taken substantially upon the plane indicated by the section line 2—2 of Figure 1, and showing the construction of a radially expansible anchor forming a part of the drill, the anchor being shown in its expanded position for anchoring the drill in place in a bore;

Figure 3 is a view similar to Figure 2 but showing the position of the anchor when the same is collapsed during a drilling operation;

Figure 9 is a bottom plan view of the head of the drill and showing the spiral groove means therein for receiving the interchangeable drill bits;

Figure 10 is a detail view in vertical section substantially upon the plane indicated by the section line 10—10 of Figure 9 and showing the manner in which the interchangeable drill bits are received in operative position in the spiral groove in the cutting face of the drill head;

Figure 5:
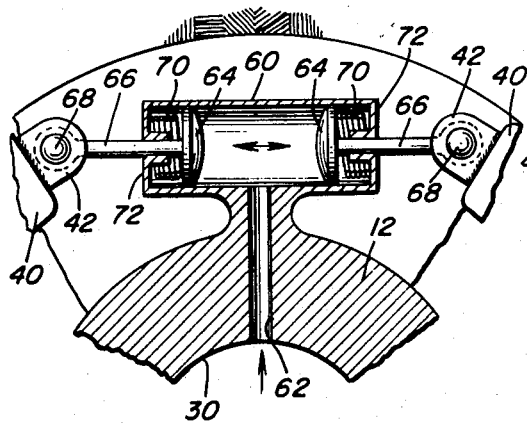
Figure 5 is a horizontal sectional detail view taken substantially upon the plane indicated by the section line 5—5 of Figure 4 and showing further details of the fluid pressure actuating means for the anchor element, the position of the parts being indicated in the expanded position of the anchor as shown in Figure 2.

Figure 11 is a view similar to Figure 10 but showing the manner in which the drill head is elevated from the drill bits in order to effect an interchangement of the latter in accordance with this invention; and Figure 12 is a detail view diagrammatically illustrating the manner in which one of the drill bits is associated with its seat in the spiral groove in the drill head during the drilling operation.

In accordance with the principles of this invention a novel construction of drill head cooperates with a plurality of polyhedral drill bits to secure a plurality of cutting faces upon the drill for more effective cutting of a bore in earth formations. The plurality of drill bits, which may consist of tetrahedron prisms, or other shapes may be employed if desired, are delivered to and removed from the face of the drill head through the hollow interior of the drill by manipulating the flow of the drilling mud from the surface of the ground, as set forth hereinafter. By manipulation of the flow of the drilling mud the bits may be retracted into the drill, or may be discharged therefrom in order to interchange or scramble the bits and provide new or interchanged cutting faces, edges and angles for the drill. Consequently, when the operation of the drill becomes inefficient due to wear of the cutting surfaces of the drill bits, the driller is enabled to quickly interchange the drill bits and thus provide new cutting edges for the drill by manipulating the drill and the flow of the drilling mud and without the necessity for withdrawing the drill string from the bore as heretofore required by conventional practice.

Referring first to Figure 1 it will be seen that the lower end of a drilling string 10 has a drill 12 thereon whose lower end constitutes a drill head 14. The lower surface of this drill head, indicated by the numeral 16 constitutes the cutting face of the drill head and in accordance with the present invention is modified from conventional practice as set forth hereinafter.

The drill is shown disposed in a bore 18 which has been cut by the drill.

Figure 7:
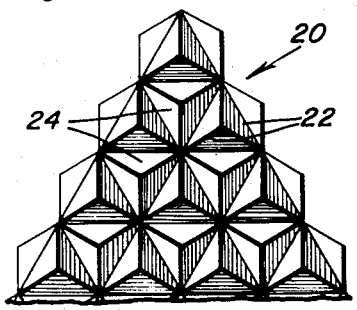
Figure 7 is an elevational view of one side of one form of the plurality of replaceable drill bits comprising an essential part of this invention.
Figure 8:
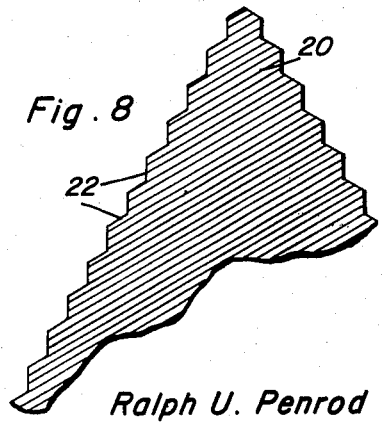
Figure 8 is a fragmentary sectional view in vertical section through a modification of the drill bit of Figure 7.

Cooperating with the face 12 of the drill head 14 are a plurality of polyhedral drill bits each designated by the numeral 20. The drill bits 20 are formed of any suitable material, in accordance with the type of formation which is to be drilled, and are of a size which will permit their ready passage down the hollow drill string and drill stem. As shown in Figures 7 and 8, the body of material constituting the drill bit is provided with a plurality of V-shaped grooves 22 which crisscross each other as will be best apparent from Figure 7 to thereby provide a plurality of tetrahedron projections 24 which thus cover each of the faces of the tetrahedron drill bit. It will thus be observed that each of the drill bits has four apices together with four triangular faces; and that each of these faces is in turn provided with a plurality of tetrahedral projections thereby increasing the number of points and edges provided by the drill bits.

Referring now especially to Figures 9, 10 and 11, it will be seen that the drill 12 has a central passage 30 therethrough forming a continuation of the passage extending through the hollow drill stem and through which the drilling mud is discharged downwardly to the bottom of the bore across the face of the drill, and from whence it passes upwardly between the drill stem and the wall of the bore to the surface.

Surrounding the bore 30 on the bottom face 16 of the drill head 14 are a plurality of convolutions, V-shaped in cross section, each designated by the numeral 32, and which constitute a spiral groove. The outermost end of this groove, as shown in Figure 9 by the numeral 34, terminates closely adjacent to the outer periphery of the face 16, while the innermost face of this groove, as indicated at 36, opens into the bore 30. The groove, as will be apparent from Figures 10 and 12, is somewhat less in depth than the vertical height of one of the pyramidal bits 20 whereby when the point of a bit is seated or disposed in the bottom of a V-shaped groove, the base of the pyramidal bit will project below the drill face 16 and thus provide a cutting point or cutting edge depending upon how the drill bit is disposed relative to the direction of rotation of the drill. As shown best in Figure 12, the width of the V-shaped groove is greater than that of the drill bit whereby to permit the latter to be tilted or cocked as shown, thus better positioning the cutting edges and points of the drill bit for attack upon the bottom surface of the well bore.

From the foregoing, it is believed that the operation of the drill bits will now be readily understood. With the drill raised slightly above the bottom of the hole, as shown in Figure 11, the quantity of drill bits supplied to the interior of the drilling stem from the surface will be carried by the drilling mud and discharged upon the bottom of the hole as shown in Figure 11. Thereafter, when the drill is lowered and rotated, the upwardly projecting apices of the tetrahedron shaped drill bits will engage in some of the convolutions 32 of the spiral groove upon the bottom face 16 of the drill head 14, and by the rotation of the drill will be progressively slid along the spiral groove outwardly towards the periphery of the drill head. At the end of the spiral groove 34, the bits will be retained until eventually the spiral groove will be completely filled with a plurality of the drill bits. Consequently, as the drill rotates, the projecting edges or points of the drill bits, as shown in Figures 10 and 12, will abrade or cut the formation.

Although as illustrated in Figures 9–11, the bore 30 is concentric with the diameter of the circular drill head 14, it will be understood that the bore may be disposed eccentrically thereof whereby the spiral arrangement of the drill bits in the groove will be effective to completely cover the entire area of the bottom of the hole below the drill head. However, in any event, if a small core is left at the center of rotation of the drill head, such core will be broken away by the pressure of the drilling fluid as well as by the remainder of the plurality of bits which will be heaped or piled in the lower portion of the bore 30.

Referring now specifically to Figures 1–6, it will be seen that the drill 12 is provided with a pair of radially expansible engaging members or anchors. These anchors may conveniently comprise a pair of arcuate shaped sections of a torus, as indicated by the numeral 40, having axially projecting pairs of apertured ears or lugs 42 at the opposite ends of each toroidal section. Projecting outwardly from the drill 12 at one side thereof is a radially extending apertured hinge 44 and a pair of links 46 are pivoted to this hinge as at 48 and to the apertured lugs 42 at one end of the toroidal sections as at 50.

Opposite each hinge 42 the drill 12 carries a rigidly mounted fluid pressure actuating cylinder 60 which is perpendicular to a radius of the drill and which communicates with the interior of the bore 30 as by a radially extending passage 62. Slidable within the cylinders 60 see Figures 5, 6, are a pair of opposed pistons 64, each having a piston rod 66 whose extremity is pivoted as at 68 to a pair of the above mentioned apertured ears 42.

Compression springs 70 are disposed in each of the cylinders 60 between the pistons 64 and the adjacent end walls 72 of the cylinders 60 to yieldingly urge the pistons towards each other and thus resiliently urge the toroidal sections 40 of the anchor into their retracted or collapsed position shown in Figure 3.

Figure 6:
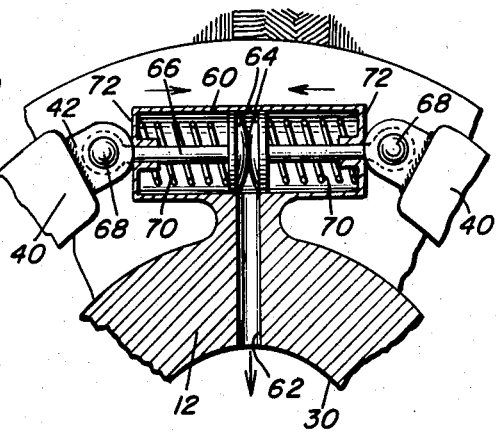
Figure 6 is a view similar to Figure 5 but showing the position of the parts when the anchor is radially contracted in the position shown in Figure 3.
Figure 4:
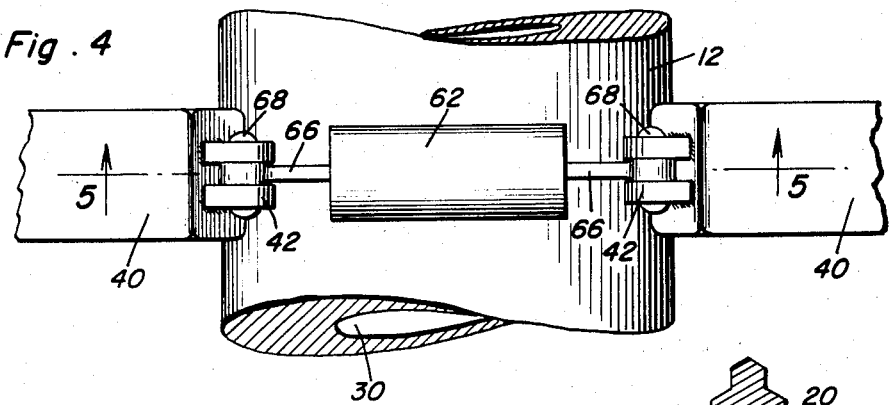
Figure 4 is a fragmentary elevational view taken on an enlarged scale and showing a portion of the anchor actuating mechanism of the expansible anchor forming a part of this invention.

During normal drilling operation, the normal pressure applied to the drilling fluid will be insufficient to overcome the springs 70, and accordingly the pistons will be in their inward position as shown in Figure 6 and the anchors will be in their retracted position as shown in Figure 3. During this position the drill is free to rotate, a supply of the drill bits being retained in the spiral groove 32 in the drill face 16 of the drill head 14, whereby the drilling operation may be continued. When it is desired to interchange the bits in order to provide fresh cutting surfaces, the rotation of the drill string is stopped, and the drill is slightly raised, by conventional manipulation of its supporting and driving means, from the position shown in Figures 1 and 10 to the position shown in Figure 11. In this position it will be observed that the bottom face 16 of the drill head 14 will be lifted above and clear the drill bits 20 as shown in Figure 11. In this position the pressure of the drilling fluid may be increased to the necessary extent to cause the pistons 64 to move outwardly as shown in Figure 5, and thus expand the anchor members as shown in Figure 2 into a tight engagement with the wall of the drilled bore. This will hold the drill bits securely in the position shown in Figure 11. The circulation of the drilling fluid may then be reversed in the well bore, and as the drilling fluid passes downwardly between the wall of the bore and the drill string, it will enter the passage 30 in the bottom of the drill, carrying with it the drill bits 20, into the interior of the drill and the drill string. This reverse circulation would be continued until all of the drill bits are recovered at the surface; or until the bits are sufficiently shaken up in order to interchange the positions of the same. Thereafter the circulation of the drilling fluid may be restored to its normal direction, and the drill bits will then be returned through the bore through the drill string and the bore 30 in the drill to the bottom of the well bore as shown in Figure 11. Thereafter, the pressure on the drilling fluid may be reduced, whereby the springs 70 will be sufficient to again retract the anchors, the drill may be lowered and drilling operations resumed.

It will thus be seen that in accordance with this invention the novel method of drilling comprises the supplying of drill bits to the bottom of the well bore and the lower face of the drill head by the flow of the drilling fluid thereto, and the recovery of the bits therefrom by reverse circulation of the drilling fluid. Further, the flow of the drilling fluid either in normal direction or in reverse direction is employed to shift and mix the plurality of drilling bits to thereby cause the same to present fresh surfaces for resuming the drilling operation.

It will be particularly noted that the above mentioned interchanging of the drilling bits, or their complete removal from the well bore or their introduction into the well bore may be effected without the necessity for withdrawing or removing the drilling string from the well bore, thereby greatly facilitating the rate of penetration and the efficiency of the drilling operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A drill comprising a drill stem and a drill head thereon having a flat drill face on its bottom surface, said drill stem having a bore opening upon said drill face and having communication with the interior of the tubular drill string to which the drill stem is connected, a groove in the drill face, a plurality of polyhedral drill bits having each a plurality of cutting edges and points, said bits being sufficiently small for passage through said bore and the interior of the drill string and having the distance from each apex of a drill bit to the opposite face greater than the depth of said groove, said groove having seating surfaces therein whereby when a side of each of the bits is seated on said seating surfaces of the groove their bases will project below the flat bottom surface of the drill face to provide cutting surfaces for said drill, said drill bits comprising tetrahedrons.

2. A drill comprising a drill stem and a drill head thereon having a flat drill face on its bottom surface, said drill stem having a bore opening upon said drill face and having communication with the interior of the tubular drill string to which the drill stem is connected, a groove in the drill face, a plurality of polyhedral drill bits having each a plurality of cutting edges and points, said bits being sufficiently small for passage through said bore and the interior of the drill string and having the distance from each apex of a drill bit to the opposite face greater than the depth of said groove, said groove having seating surfaces therein whereby when a side of each of the bits is seated on said seating surfaces of the groove their bases will project below the flat bottom surface of the drill face to provide cutting surfaces for said drill, each face of each of said drill bits having V-shaped crisscrossed grooves therein whereby to provide between said grooves diamond shaped prismatic pointed projections.

3. A drill comprising a drill stem and a drill head thereon having a flat drill face on its bottom surface, said drill stem having a bore opening upon said drill face and having communication with the interior of the tubular drill string to which the drill stem is connected, a groove in the drill face, a plurality of polyhedral drill bits having each a plurality of cutting edges and points, said bits being sufficiently small for passage through said bore and the interior of the drill string and having the distance from each apex of a drill bit to the opposite face greater than the depth of said groove, said groove having seating surfaces therein whereby when a side of each of the bits is seated on said seating surfaces of the groove their bases will project below the flat bottom surface of the drill face to provide cutting surfaces for said drill, said channel means being in the form of a continuous groove.

4. A drill comprising a drill stem and a drill head thereon having a flat drill face on its bottom surface, said drill stem having a bore opening upon said drill face and having communication with the interior of the tubular drill string to which the drill stem is connected, a groove in the drill face, a plurality of polyhedral drill bits having each a plurality of cutting edges and points, said bits being sufficiently small for passage through said bore and the interior of the drill string and having the distance from each apex of a drill bit to the opposite face greater than the depth of said groove, said groove having seating surfaces therein whereby when a side of each of the bits is seated on said seating surfaces of the groove their bases will project below the flat bottom surface of the drill face to provide cutting surfaces for said drill, said channel means being in the form of a continuous groove having a plurality of turns around said drill face.

5. A drill comprising a drill stem and a drill head thereon having a flat drill face on its bottom surface, said drill stem having a bore opening upon said drill face and having communication with the interior of the tubular drill string to which the drill stem is connected, a groove in the drill face, a plurality of polyhedral drill bits having each a plurality of cutting edges and points, said bits being sufficiently small for passage through said bore and the interior of the drill string and having the distance from each apex of a drill bit to the opposite face greater than the depth of said groove, said groove having seating surfaces therein whereby when a side of each of the bits is seated on said seating surfaces of the groove their bases will project below the flat bottom surface of the drill face to provide cutting surfaces for said drill, said groove being V-shaped and having outwardly divergent side walls with the distance between their outer edges being greater than the width of the portions of the drill bits received therebetween whereby to provide a clearance with the latter facilitating repositioning of the drill bits in said groove, said groove comprising a continuous spiral eccentric to the axis of rotation of the drill and with the radially inward end of said groove in direct communication with said bore.

6. The combination of claim 5 wherein the radially outer end of said groove is closed whereby to retain said bits in said groove.

References Cited in the file of this patent

UNITED STATES PATENTS

| Re. 11,597 | Davis | Apr. 27, 1897 |
|---|---|---|
| 649,488 | Schrader | May 15, 1900 |
| 1,420,365 | Chapman | June 20, 1922 |
| 1,502,851 | Gale | July 29, 1924 |
| 2,233,260 | Hawthorne | Feb. 25, 1941 |
| 2,587,831 | Frick | Mar. 4, 1952 |
| 2,690,224 | Roberts | Sept. 28, 1954 |